US005859088A

United States Patent [19]

Peterson et al.

[11] Patent Number: 5,859,088
[45] Date of Patent: *Jan. 12, 1999

[54] RADIATION-CURABLE POLY(α-OLEFIN) ADHESIVES

[75] Inventors: James Richard Peterson; Gaddam Nana Babu; Eric Ryan Bennett, all of St. Paul, Minn.

[73] Assignee: Minnesota Mining and Manufacturing Company, St. Paul, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 756,870

[22] Filed: Nov. 26, 1996

Related U.S. Application Data

[63] Continuation-in-part of Ser. No. 491,532, Jun. 16, 1995, abandoned, which is a continuation of Ser. No. 46,235, Apr. 13, 1993, abandoned.

[51] Int. Cl.$^6$ .................................................... C08J 3/28
[52] U.S. Cl. .......................... 522/157; 522/161; 526/348; 526/348.2; 526/348.5; 526/931; 525/240; 525/232; 525/191
[58] Field of Search .................................. 526/348, 348.2, 526/348.5, 93.1; 428/355, 345; 525/240, 232, 191, 332.5, 320, 321, 323; 522/157, 161

[56] References Cited

U.S. PATENT DOCUMENTS

| | | | |
|---|---|---|---|
| 2,484,529 | 10/1949 | Roedel | 204/158 |
| 2,532,011 | 11/1950 | Dahlquist et al. | 154/53.5 |
| 2,933,480 | 4/1960 | Gresham . | |
| 3,542,717 | 11/1970 | Lipman . | |
| 3,635,755 | 1/1972 | Balinth et al. | 117/122 |
| 3,933,769 | 1/1976 | Lal et al. . | |
| 3,954,697 | 5/1976 | McConnell et al. | 526/350 |
| 3,955,014 | 5/1976 | Mostev et al. | 427/54 |
| 3,957,724 | 5/1976 | Schurb et al. . | |
| 4,072,813 | 2/1978 | McConell et al. | 526/348 |
| 4,167,415 | 9/1979 | Higuchi et al. | 96/115 R |
| 4,178,272 | 12/1979 | Meyer et al. . | |
| 4,181,752 | 1/1980 | Martens et al. | 427/54.1 |
| 4,210,570 | 7/1980 | Trotter et al. . | |
| 4,259,470 | 3/1981 | Trotter et al. | 526/348 |
| 4,288,358 | 9/1981 | Trotter et al. . | |
| 4,311,810 | 1/1982 | Fuji et al. | 525/321 |
| 4,329,384 | 5/1982 | Vesley et al. | 428/40 |
| 4,386,135 | 5/1983 | Campbell et al. | 428/447 |
| 4,477,636 | 10/1984 | Muroi et al. | 525/444 |
| 4,533,566 | 8/1985 | Evans et al. | 427/44 |
| 4,727,113 | 2/1988 | Kohyama et al. | 525/193 |
| 4,826,939 | 5/1989 | Stuart, Jr. | 526/348 |
| 4,990,585 | 2/1991 | Kawata et al. | 526/348.5 |
| 5,112,882 | 5/1992 | Babu et al. | 522/158 |
| 5,194,501 | 3/1993 | Babu et al. | 525/103 |
| 5,202,361 | 4/1993 | Zimmerman et al. | 522/120 |
| 5,209,971 | 5/1993 | Babu et al. | 428/355 |
| 5,227,442 | 7/1993 | Babu et al. | 526/279 |
| 5,294,668 | 3/1994 | Babu | 525/80 |
| 5,559,164 | 9/1996 | Babu et al. | 522/157 |

FOREIGN PATENT DOCUMENTS

| | | |
|---|---|---|
| 856337 | 11/1970 | Canada . |
| 0 003 194 | 7/1979 | European Pat. Off. . |
| 0 620 257 A2 | 10/1994 | European Pat. Off. . |
| 0 620 258 A2 | 10/1994 | European Pat. Off. . |
| 59-157106 | 9/1984 | Japan . |
| WO 92/07916 | 5/1992 | WIPO . |

OTHER PUBLICATIONS

Odian, G., "Ziegler–Natta Polymerization of Nonpolar Vinyl Monomers," *Principles of Polymerization,* Ch. 8.4, Second Edition, J. Wiley & Sons, New York, pp. 591–623 (1981).

J. Boor, "Polymerization of Monomers," *Ziegler–Natta Catalysts an Polymerizations,* Ch. 19, Academic Press, NY, pp. 512–562 (1979).

*Primary Examiner*—Mark L. Warzel

[57] ABSTRACT

The invention relates to adhesive compositions comprising polymers comprising $C_6$ to $C_{12}$ saturated α-olefin monomers and $C_2$ to $C_5$ α-olefin monomers and an effective amount of photoactive crosslinking agent to crosslink composition upon radiation from a source of actinic radiation.

28 Claims, No Drawings

RADIATION-CURABLE POLY(α-OLEFIN) ADHESIVES

This is a continuation-in-part of U.S. patent application Ser. No. 08/491,532 filed Jun. 16, 1995 (now abandoned) which was a continuation of U.S. patent application Ser. No. 08/046,235 filed Apr. 13, 1993 (now abandoned).

FIELD OF THE INVENTION

This invention relates to radiation curable poly(α-olefin) compositions providing adhesives having a superior balance of peel adhesion and cohesive strength at elevated temperatures as well as at room temperature.

BACKGROUND OF THE INVENTION

A continuing need in the pressure sensitive adhesive (PSA) art is achieving better control over various mechanical and process properties so that adhesives can be "tailor-made" for specific, highly demanding end-use applications. such as packaging, medical, and masking tapes. These applications require a proper balance of properties, and this balance changes with the particular end-use.

Among the earliest polymers to provide a reasonable balance of the properties required for satisfactory PSA performance were the natural and synthetic rubbers. However, these PSAs had poor aging properties, and the art quickly recognized the need to eliminate ethylenically unsaturated groups from the polymer backbone of rubber adhesives in order to improve their oxidative stability.

With the discovery of Ziegler-Natta (ZN) catalysts, it became possible to polymerize α-olefin monomers to high molecular weight. The homopolymers of the $C_6$–$C_{10}$ α-olefins were naturally tacky and therefore good candidates for PSAs since they also had low toxicity, good aging and favorable environmental stability (i.e., low oxidation). These homopolymers were chemically inert, resistant to plasticizer migration, and relatively inexpensive. However, they had poor cohesive strength and therefore, lacked the shear adhesion necessary for high performance PSAs.

Use of ZN catalysts to make homopolymers from α-olefin monomers, and to make copolymers from mixtures of α-olefin and nonconjugated polyene monomers is known the art and is succinctly summarized in Odian, G., "Principles of Polymerization", Ch. 8.4 (Second Edition J. Wiley & Sons, New York, 1981). For a more detailed discussion of the polymerization of α-olefins, see Boor, J., "Ziegler-Natta Catalysts and Polymerizations", Ch. 19 (Academic Press, NY, 1979).

Adhesives derived primarily from $C_6$ or higher α-olefins are also known. U.S. Pat. No. 3,542,717 describes poly(α-olefin) adhesive compositions comprising mixtures of polyolefin copolymers derived from olefin monomers with different molecular weights (i.e., copolymers from an α-olefin monomer having 11–20 carbon atoms, and a different α-olefin monomer having 4–20 carbon atoms.)

U.S. Pat. No. 3,635,755 describes polyolefin PSAs suitable for use as a single component PSAs for surgical tapes that are substantially non-allergenic. Such adhesives can be made from homopolymers of the $C_6$ to $C_{10}$ α-olefins or from inter-polymers of $C_2$ to $C_{16}$ α-olefins having an intrinsic viscosity of 1.5 to 7.0, a Williams plasticity of 0.8 to 4.0, and an acetone/heptane soluble fraction of less than 25% by weight. This patent does not teach that its polyolefin compounds are radiation curable.

U.S. Pat. Nos. 3,954,697 and 4,072,812 describe hot melt adhesives based respectively on propylene/$C_6$–$C_{10}$ 1-olefins wherein the $C_6$–$C_{10}$ 1-olefins comprise 40 to 60 mole percent of the composition and 1-butene/$C_6$–$C_{10}$ 1-olefins wherein the $C_6$–$C_{10}$ 1-olefins comprise 40 to 60 mole percent of the composition. These compositions have no detectable crystallinity by DSC (differential scanning calorimetry). These two patents also teach that copolymers containing only minor amounts of propylene or butylene (e.g., 5–20% by wt.) are permanently tacky. Moreover, they teach that copolymers containing only minor amounts of propylene or butylene have little static shear and fail in the static shear test after less than 100 minutes.

U.S. Pat. No. 4,178,272 describes hot melt adhesives based on a blend of poly(propylene-co-higher 1-olefin) containing 35 to 65 mole percent higher 1-olefin. In addition, tackifying resin and crystalline polypropylene are added. Without the crystalline polypropylene homopolymer, the adhesive exhibits excessive creep under load.

U.S. Pat. No. 4,259,470 describes hot melt adhesives containing propylene, 1-butene or 1-pentene and 3 to 14 mole percent of at least one $C_6$–$C_{10}$ linear α-olefin. Tackifying resins and plasticizing oils are also added to the hot-melt compositions.

U.S. Pat. No. 4,288,358 describes hot-melt adhesive compositions containing terpolymers of 10 to 55 mole percent propylene, 15 to 60 mole percent α-1-butene or 1-pentene and 5 to 39 mole percent higher I-olefins, i.e., $C_6$–$C_{10}$ α-olefins. Tackifying resins and plasticizing oils are also added to the hot-melt compositions.

U.S. Pat. No. 5,112,882 describes a radiation curable poly(α-olefin)-containing adhesive composition that is pressure-sensitive at room temperature which upon cure yields an adhesive film having superior balance of peel and shear adhesion. The adhesive composition comprises (a) $C_6$ to $C_{10}$ α-olefin monomer(s) and 0 to 15 mole percent of polyene monomers and (b) sufficient photoactive crosslinking agent to crosslink the composition upon irradiation. Sufficient radiation energy to generate free radicals is required to cross-link the composition.

SUMMARY OF THE INVENTION

Briefly, the present invention provides a composition that includes a saturated α-olefin polymer including (1) the polymerization product of from about 70 to about 99 mole percent of one or more $C_6$ to $C_{12}$ α-olefin monomers and (2) from about 1.0 to about 30 mole percent of one or more $C_2$ to $C_5$ α-olefin monomers; an effective amount of a photoactive crosslinking agent to crosslink the composition upon irradiation from a source of actinic radiation; and from 0 to about 150 parts, per 100 parts polymer, of a tackifying resin. The composition is a PSA both before and after crosslinking and, before crosslinking, has an inherent viscosity in the range of 1.3 to 2.0.

Compositions with improved PSA properties may be obtained by blending two or more polymers of the invention or by blending one or more polymers with tackifying resins. Preferably, 100 parts by weight polymer is blended with 1 to 150 parts by weight of tackifying resin.

The adhesives of the invention can be applied to appropriate substrate surfaces by a wide range of processes such as, for example, solution coating, solution spraying, hot-melt extrusion, emulsion coating, etc., to make adhesive tapes, adhesive transfer films, and the like.

As used hereinthroughout, the following definitions apply unless a contrary intent is explicitly stated:

"$C_6$ to $C_{12}$ α-olefin monomer" means a linear or branched hydrocarbon having 6 to 12 carbon atoms, one terminal ethylenically-unsaturated group, and no other functional group;

"polymer" means a homopolymer, a copolymer, a terpolymer, or a tetrapolymer (polymers derived from more than one monomer may be either random or block copolymers); and "photoactive crosslinking agent" means a compound which, under the influence of suitable actinic radiation, initiates free radical formation and subsequent inter-chain crosslink and which may or may not become incorporated therein, thus increasing the cohesive strength of the adhesive.

DETAILED DESCRIPTION OF PREFERRED EMBODIMENTS

The radiation curable α-olefin polymer of the present invention have a hydrocarbyl backbone and the general formula $$(M^1)_x\text{--}(M^2)_y \qquad \qquad \text{I}$$

wherein x and y are numbers designating the relative molar amounts of $M^1$ and $M^2$ that are randomly located in the backbone chain of the polymer such that the polymer has a weight average molecular weight of at least 250,000 (which roughly corresponds to an inherent viscosity of about 1.3), x is at least 70 to 99 mole percent of the sum (x+y) and y is at least 1 to 30 mole percent of the sum (x+y); $M^1$ is an ethanediyl repeat unit having a pendant hydrocarbyl group having 4 to 10 carbons; and $M^2$ is different from $M^1$ and is a ethanediyl repeat unit selected from ethylene or units having a pendent hydrocarbyl group selected from linear and branched alkyl groups having 1 to 3 carbon atoms.

Most preferably, the novel radiation curable α-olefin polymers have the general formula $$-(CH_2-CH)_x-(CH_2-CH)_y- \atop \phantom{-(CH_2-}R^1\phantom{)_x-(CH_2-}R^2$$

wherein $R^1$ is an alkyl group having 4 to 10 carbon atoms, preferably 4 to 6 carbon atoms; $R^2$ is hydrogen or a hydrocarbyl group selected from alkyl groups having 1 to 3 carbon atoms; x and y are numbers designating the relative molar amounts of monomer units randomly located in the backbone chain of the polymer such that the polymer has a weight average molecular weight of at least 250,000, x is from 70 to 99 mole percent of the sum (x+y) and y is from 1 to 30 mole percent of the sum (x+y). Even more preferably, x is from about 80 to about 99 mole percent of the sum (x+y), and y is from about 1 to about 20 mole percent of the sum (x+y).

Suitable $C_6$ to $C_{12}$ α-olefin monomers include both linear and branched α-olefin monomers. Examples of which include but are not limited to 1-hexene, 1-heptene, 1-octene, 1-nonene, 1-decene, 2-methyl-1-pentene, 4-methyl-1-pentene, 5-methyl-1-hexane, 6-methyl-1-heptene, 5-methyl-1-heptene, 2-methyl-1-heptene, and the like.

Preferably, the saturated α-olefin polymers of the present invention have a glass transition temperature ($T_g$) in the range of from about −70° to about 0° C., more preferably in the range of from about −60° C. to about −20° C. In addition, the saturated polymers of the present invention have an inherent viscosity ("IV"), prior to crosslinking, in the range of from about 1.3 to about 2.0 dL/g. The weight average molecular weights of the polymers are in the range of from about 250,000 to about 5,000,000, more preferably in the range of from about 500,000 to about 1,000,000. Within these general molecular weight ranges, inclusion of mer units derived from $C_2$–$C_5$ α-olefins can be especially useful. Below molecular weights of about 250,000, inclusion of mer units derived from $C_2$–$C_5$ monomers tends to negatively affect the ability of the polymer to gel (i.e., due to excessive chain scission). Above about 5,000,000, inclusion of mer units derived from $C_2$–$C_5$ monomers does not seem to greatly affect the ability of the polymer to gel (i.e., homopolymers of $C_6$–$C_{12}$ α-olefins possess sufficient entanglements that inclusion of $C_2$–$C_5$ mer units is not particularly beneficial).

The α-olefin monomers can be polymerized in the presence of Ziegler-Natta (ZN) catalysts over a wide range of temperatures, e.g. 0° to 140° C., preferably 30° to 90° C. The polymerization can be done in bulk or in inert solvents. Suitable examples of inert solvents include, but are not limited to, the aliphatic, aromatic, and cycloaliphatic hydrocarbon solvents, i.e., pentane, hexane, heptane, benzene, toluene, cyclopentane, and cyclohexane. The amount of catalyst used is preferably in the range of 0.1 to 5 g per kg of monomer, more preferably 0.2 to 3 g per kg of monomer, and most preferably 0.5 to 2 g per kg of monomer. ZN catalysts are well known in the art and are disclosed, for example, in Odian, G., supra, and Boor, J., supra.

Analysis of polymers that contain only mer units derived from $C_6$ to $C_{12}$ α-olefin monomers and $C_2$ to $C_5$ α-olefin monomers show that the polymers are completely saturated.

Suitable photocrosslinking agents for use in the compositions of the invention, which are free of elemental sulfur include, but are not limited to: aldehydes, such as benzaldehyde, acetaldehyde, and their substituted derivatives; ketones such as acetophenone, benzophenone and their substituted derivatives such as Sandoray™ 1000 (Sandoz Chemicals, Inc., Charlotte, N.C.); quinones such as the benzoquinones, anthraquinone and their substituted derivatives; thioxanthones such as 2-isopropylthioxanthone and 2-dodecylthioxanthone; and certain chromophore-substituted vinyl halomethyl-sym-triazines such as 2,4-bis-(trichloromethyl)-6-(3',4'dimethoxyphenyl)-sym-triazine. The concentration of photoactive crosslinking agent can be present in the range of 0.01 to 6.0 percent by weight, preferably 0.1 to 2% by weight of the polymer, and more preferably 0.5 to 1.5% by weight.

The saturated α-olefin polymers of the present invention can be coated from solution by any coating processes well known in the art such as, for example, knife coating, roll coating, gravure coating, curtain coating, etc. Useful coating thicknesses for the present invention are in the range of 0.5 to 15 mg/cm², preferably in the range of 2.0 to 7.0 mg/cm². Furthermore, some of the compositions of the invention can be applied by extrusion coating with no solvent present thereby eliminating environmental and toxicity problems associated with solution coating processes.

In addition, the adhesive composition can be cured using a source of actinic radiation of sufficient energy (i.e., wavelength range) to generate free radicals when incident upon the particular photoactive crosslinking agent selected for use in the composition. The preferable wavelength range for the photoactive cross-linking agents disclosed above is 400 to 250 nm. The radiant energy in this preferred range of wavelengths required to crosslink the adhesive film of the invention is 100 to 1500 ni/cm² and more preferably 200 to 800 mJ/cm². Details of the photocure process are disclosed in U.S. Pat. Nos. 4,181,752 and 4,329,384. Additionally, the adhesive compositions of the present invention, with or without a photoactive crosslinking agent, may be cured by electron beam irradiation.

The crosslinked adhesive films preferably have a gel content in the range of from 2 to 95 weight percent, more preferably from 30 to 80 weight percent, and most preferably from 50 to 70 weight percent when the gel content has been corrected for soluble tackifying resins and other additives as hereinafter described.

The addition of one or more tackifying resins to the saturated α-olefin polymers of the present invention can provide PSAs having improved tack, lower viscosity, improved coatability, good heat stability, and improved peel adhesion. The shear adhesion of the tackified compositions can be enhanced by radiation cure with no loss of peel adhesion. The resulting adhesives have the high internal or cohesive strength required for box sealing tape or masking tape applications.

Compatible tackifying resins useful in the radiation curable adhesive compositions of the invention include resins derived by polymerization from $C_5$ to $C_9$ unsaturated hydrocarbon monomers, polyterpenes, synthetic polyterpenes, and the like. Hydrocarbon tackifying resins can be prepared by polymerization of monomers consisting primarily of olefins and diolefins and include, for example, residual by-product monomers of the isoprene manufacturing process. These hydrocarbon tackifying resins typically exhibit Ball and Ring softening Points (ASTM D465-59) of from about 80° C. to about 145° C.; acid numbers of from about 0 to 2, and saponification values of less than one.

Examples of such commercially available resins based on a $C_5$–$C_9$ olefin fraction of this type are Wingtack™ 95, Wingtack™ 115, and Wingtack™ Plus tackifying resins available from Goodyear Tire and Rubber Co. Other hydrocarbon resins include Regalrez™ 1078 and Regalrez™ 1126 available from Hercules Chemical Co. Inc. (Wilmington, Del.); Arkon resins, such as Arkon™ P115, available from Arakawa Forest Chemical Industries (Chicago, Ill.); and Escorez™ resins available from Exxon Chemical Co.

Other suitable resins include the terpene polymers, such as polymeric resinous materials obtained by polymerization and/or copolymerization of terpene hydrocarbons such as their mixtures, including carene, isomerized pinene, terpinene, terpentene, and various other terpenes. Commercially available resins of the terpene type include the Zonarez™ terpene B-series and 7000 series available from the Arizona Chemical Corp. (Wayne, N.J.). Typical properties reported for the Zonarez™ terpene resins include Ball and Ring Softening of less than one, and Saponification Numbers (ASTM D464-59) of less than one. The terpene resin used in examples below is a poly(beta-pinene) resin, Piccolyte™ A1115 available from Hercules Chemical Co. Inc., which has a Ball and Ring Softening Point of 115° C., an Acid Number 4 of one, and Iodine Number 4 of 190.

The tackifying resins may contain ethylenic unsaturation; however, saturated tackifying resins are preferred for those applications where oxidation resistance is important. The total amount of tackifying resins in the composition ranges from 0 to 150 parts, more preferably 5 to 50 parts, and most preferably 25 to 35 parts by weight per 100 parts of polymer. Saturated tackifying resins such as Regalrez™ 1078 and Arkon™ P115 are preferred because they yield a higher gel content upon equivalent treatment by an activated crosslinking agent.

Minor amounts of additives can also be included in the composition to provide adhesives for special end uses. Such additives may include pigments, dyes, plasticizers, fillers, stabilizers, ultraviolet absorbers, antioxidants, processing oils, and the like. Amount of additives used can vary from 0.1 to 50 weight percent depending on the end use desired.

The adhesive composition of the present invention can be coated onto a wide range of substrate materials, examples being polymer films such as polyethylene terephthalate (PET), and biaxially oriented polypropylene (BOPP); woven and non-woven fabrics; metals and metal foils such as aluminum, copper, lead, gold and the like; paper; glass; ceramics; and composite materials comprised of laminates of one or more of these materials.

The present invention provides a poly(α-olefin) containing adhesive compositions that are radiation-curable to yield PSA adhesive films with an improved balance of peel adhesion and cohesive strength, especially at elevated temperatures. The peel adhesion and cohesive strength values are capable of being varied independently to achieve desired values. Adhesive films of the invention preferably have peel values in the range of 2 to 100 N/dm and shear values in the range of 1 to 10,000 or more minutes.

The present invention provides pressure-sensitive adhesives which have good cohesive strength at elevated temperatures. The PSA tapes of the invention are ideally suited for automotive masking tape applications and other tape applications requiring good cohesive strength at elevated temperatures and yet are readily removed from painted or other surfaces leaving no adhesive residue.

Another embodiment of the invention comprises a laminated structure of at least a first and a second substrate, the substrates being joined by a layer of the adhesive composition of the invention. At least one of the substrates is capable of transmitting actinic or electron beam radiation so that the adhesive film may be cured.

In some applications primers may be useful for improving the adhesion of the adhesive to some substrates. Useful primers for the practice of the present invention include a triblock copolymer of styrene-ethylene/butylene-styrene grafted with maleic anhydride (Kraton™ G-1901X, Shell Chemical Co.) and a combination of amorphous polypropylene and Kraton™ G-1901X Release liners (such as described in U.S. Pat. Nos. 4,386,135, 3,957,724, and 2,532,011) form a special class of substrates on which the composition of the invention can be coated and subsequently radiation cured to form adhesive transfer films.

TEST METHODS

The test procedures used in the examples to evaluate and compare the properties of the PSA compositions and tapes made from them are industry standard tests. These tests are described in detail in various publications of the American Society for Testing Materials (ASTM), Philadelphia, Pa., and the Pressure Sensitive Tape Council (PSTC), Glenview, Ill. References to these standards also are given.

Shear Strength (ASTM D-3654-78; PSTC-7)

Shear strength is a measure of the cohesiveness or internal strength of an adhesive. It is based upon the amount of force required to pull an adhesive strip from a standard flat surface in a direction parallel to the surface to which it has been affixed with a definite pressure. It is measured in units of time (e.g., minutes) required to pull a standard area of PSA coated sheet material from a stainless steel test panel under stress of a constant, standard load.

The tests were conducted on adhesive coated strips applied to a stainless steel panel such that a 12.7 mm×12.7 mm portion of each strip was in firm contact with the panel with one end portion of the tape being free. The panel with coated strip attached was held in a rack such that the coated surface of the panel forms an angle of 182° with the vertical tape free end which is then tensioned by application of a force of one kilogram applied as a hanging weight from the free end of the coated strip. (The 182° angle is used to negate peel forces thus ensuring that only shear forces are measured, thereby more accurately determining the holding power of the tape being tested.) The time elapsed for each test specimen to separate from the steel panel is recorded as the shear strength.

Mode of Failure (MOF)

The time at which the mass falls is called "Shear Test" and is reported as "5000+" if the tape has not failed after 5000 minutes. With each shear is indicated the mode of failure as follows:

po=pop-off, i.e., 75–100% adhesive failure from steel-plate;

f=cohesive failure both surfaces completely covered by adhesive;

The pop-off failure mode is preferred because it is indicative of adhesive failure of the adhesive/steel interfacial bond as opposed to cohesive failure of the adhesive. Adhesives of various shear adhesions, all within the range of the present invention (1–10,000 minutes), are preferred depending on end-use applications.

Two specimens of each tape were tested and the shear tests were averaged to obtain the shear value.

Peel Adhesion [ASTM D 3330-78; PSTC-l(l 1/75)]

Peel adhesion is the force required to remove a PSA coated test specimen from a test panel measured at a specific angle and rate of removal. In the examples, this force is expressed in Newtons per decimeter (N/dm) width of coated sheet. The procedure followed is:

(1) A 25.4 mm×150 mm test specimen was applied to a horizontally positioned clean glass test plate such that 12.7 mm of the specimen extended beyond the plate. A 2.3 kg rubber roller was rolled over the test specimen twice to insure good contact between the specimen and the test plate.

(2) The free end of the specimen is doubled back nearly touching itself so the angle of removal is 180°. The free end is attached to the adhesion tester scale.

(3) The glass test plate is clamped in the jaws of tensile testing machine which is capable of moving the plate away from the scale at a constant rate of 2.3 m/min.

(4) The scale reading (in Newtons) is noted as the tape is peeled from the glass surface, and the average, peak, and valley reading from the entire length of peeled tape specimen are recorded.

Inherent Viscosity [ASTM D 2857-70 (Reapproved 1977)]

In order to understand the benefits derived from the teaching of this invention, it is necessary to relate the improvements in shear strength and processability to the molecular weight of the PSA. The inherent viscosity of 10 mL portion of a 0.5 g/dL solution of the sample in toluene is measured using a Cannon-Fenske 150 viscometer in a water bath controlled at 25° C. The solvent used is specified in the examples.

Percent Gel Test [ASTM D 3616-82]

The percent gel is used as an indication of cure level. The tapes containing tackifying resins are corrected to the actual percent gel. The corrected percent gel is 100 times the gelled mass divided by the total mass of material that is capable of forming a gelled network. Soluble materials such as tackifiers are subtracted out when determining the gel fraction.

Many important properties of cross-linked pressure-sensitive adhesives vary with the gel content. Hence, determination of the gel content provides a means for controlling the process and thereby raising the quality of the tape.

Extraction tests permit verification of the proper gel content of polyolefin PSAs and they also permit comparison between different crosslinked adhesives and their specific end uses.

Gel Content Determination

A square test specimen (3.81 cm×3.81 cm) containing approximately 0.06 g of PSA is cut from the tape and placed in a 120-mesh stainless steel basket measuring approximately 4.4×4.4×1.3 cm. The contents are weighed to the nearest 0.1 mg and then immersed in a capped beaker containing sufficient toluene to cover the specimen. After extraction for 24 to 48 hours, the basket (containing the specimen) is removed, drained, and placed in an oven at 93° C. The basket and specimen are dried to a constant weight and the gel content is determined as follows:

$$\text{Extract \%} = \frac{\text{weight lost during extraction} \times 100}{\text{weight of original specimen}}$$

Gel content = 100 − Extract %

The gel content of the adhesive was determined after correcting for the tackifier. (and backing for a tape construction).

Two specimens of each tape were tested and the results were averaged to obtain the gel content value.

Percent Residue Test

An aluminum panel painted with an automotive basecoat/clearcoat (BC/CC) acrylic enamel paint system or the automotive 50J™ acrylic enamel paint of Ford Motor Co. is used as a test panel for the percent residue test.

Tapes are applied at room temperature to the test surface, followed by rolling the test specimen with two passes of a 4.5-pound (2-kg) rubber-coated metal roller. After one hour in an air-circulating oven at either 121° or 150° C., the tape is peeled back, while hot, at an angle of 135° at an approximate rate of 1.9 m/nin. across half of the panel. Thereafter, the test panel is allowed to cool to room temperature and the tape samples are peeled from the remainder of the test panel at an angle of 45° peel and a rate of approximately 1.9 m/min. The panel is then visually examined for any adhesive residue.

This invention is further illustrated by the following examples of preferred embodiments thereof, although it will be understood that these examples are included merely for purposes of illustration and are not intended to limit the scope of the invention unless otherwise specifically indicated.

Saturated α-olefin copolymers 1-Hexene/ethylene copolymer (S-1)

1-hexene (400 g, distilled and dried over molecular sieves from Ethyl Corp.) and 0.5 g Aluminum Activated Reduced TiCl$_3$ (AATiCl$_3$) (Stauffer Chemical; Hartford, Conn.) wire placed into a clean, dry, 2-liter Parr autoclave, equipped with a stirrer in an argon filled glove bag. The autoclave was sealed in the glove bag. The sealed autoclave was placed in a shaker and 100 g ethylene was pressured into autoclave followed by heating to 50° C. Diethylaluminum chloride (1.0 g) was injected into the autoclave through a catalyst injector to initiate the polymerization. The molar ratio of Al to Ti in the catalyst was 2:1. The copolymerization was exothermic and the temperature of the reaction mixture increased to 90° C. The reaction was run for 45 min. and then methanol (20 mL) was added to deactivate the catalyst. Excess methanol was added to precipitate the polymer and the precipitated polymer washed twice with methanol. A tacky amorphous polymer was obtained in 68% conversion having an inherent viscosity of 3.7 dL/g in n-hexane and a T$_g$ of −32° C. $^{13}$C NMR analysis indicated that the polymer contained 81 mole percent of 1-hexene and 19 mole percent of ethylene.

1-Hexene/propylene copolymer (S-2)

A reaction vessel equipped with a mechanical stirrer, reflux condenser, and temperature control was dried and filled with nitrogen. The vessel was charged with 400 g of 1-hexene (from Ethyl Corp.), the temperature was adjusted to 25° C., and hydrogen (Oxygen Services ultra high purity) bubbled in at a rate of about 60 mL/min. 2.2 nL of a 1.8M solution of diethylaluminum chloride (from Aldrich Chemical Co.) was added followed by the addition of 0.4 g AATiCl$_3$ and immediately propylene was bubbled into the reaction mixture at about 60 mL/min for 30 minutes. Methanol (20 mL) was added to terminate the polymerization and the polymer precipitated in excess methanol to extract the catalyst residues. A tacky amorphous polymer was obtained in 72% conversion having an inherent viscosity of 5.7 dL/g in n-hexane and a $T_g$ of –32° C. $^3$C NMR analysis indicated that the polymer contained 87 mole percent of 1-hexene and 13 mole percent of propylene.

1-Hexene/propylene copolymer (S-3)

The procedure used for the preparation of copolymer (S-2) was repeated except that the reaction vessel was charged with 1-hexene containing 12.6 percent of toluene. A tacky amorphous polymer (S-3) was obtained in 57% conversion having an inherent viscosity of 4.7 dL/g in n-hexane and a $T_g$ of –35° C. It contained 85 mole percent of 1-hexene and 15 mole percent of propylene.

1-Octene/ethylene copolymer (S-4)

The procedure used for the preparation of copolymer S-2 was repeated except that 1-hexene was replaced with 1-octene. A tacky amorphous polymer was obtained in 56% conversion having an inherent viscosity of 4.2 dL/g in n-hexane and a $T_g$ of –51° C. It contained 89 mole percent of 1-octene and 11 mole percent of ethylene.

1-Octene-propylene copolymer (S-5)

The procedure for the preparation of copolymer S-1 was repeated except that 1-hexene was replaced with 1-octene. A tacky amorphous polymer was obtained in 82% conversion having an inherent viscosity of 3.8 dL/g in n-hexane and a $T_g$ of –56° C. It contained 95 mole percent of 1-octene and 5 mole percent of propylene.

1-Decene-ethylene copolymer (S-6)

The procedure used for the preparation of copolymer S-1 was repeated except that 1-hexene was replaced with 1-decene. A tacky amorphous polymer was obtained in 65% conversion having an inherent viscosity of 4.2 dL/g in n-hexane and a $T_g$ of –45° C. It contained 91 mole percent of 1-decene and 9 mole percent of ethylene.

EXAMPLE 1–11

PSAs From Saturated Polyolefins

Blends of 100 parts of the saturated α-olefin-polymers, S1, S2, S3, S4, S5, and S6, with and without 33 phr (parts per 100 parts by weight) of tackifier resin, 1.0 phr of photoinitiator, and 0.25 phr of Irganox™ 1010 in toluene were knife coated to produce a dry adhesive coating thickness of 25 μm on a 51 μm biaxially oriented poly(ethylene terephthalate) (ET) film. Each coating was dried for 5 minutes at 157° F. (70° C.) and cured by exposure to doses of from 300 to 1200 mJ/cm$^2$ from medium pressure mercury lamps. The compositions prepared and the test results obtained for each are recorded in Table I.

Comparative Examples C1, C2, C3, C4, C5 and C6

Comparative Examples C1, C2, C3, C4, C5 and C6 consisted of the saturated α-olefin-polymers, S1, S2, S3, S4, S5, and S6, as previously described, which were knife coated onto a 51 μm thick biaxially oriented PET film to produce dry PSA coatings having a nominal thickness of 25 μm. The coating conditions and subsequent test protocol was the same as described for Examples 1–11. In all cases, the comparative examples were prepared without tackifier and were also not irradiated.

TABLE I

Adhesive Compositions with Saturated Polyolefin

| Ex. No. | Saturated Components | Tackifier (phr) | UV Exposure mJ/cm$^2$ | Peel N/dm | Gel % | Shear Strength 25° (min) (failure mode) | 70° (min) | % Residue 121° C. | 150° C. |
|---|---|---|---|---|---|---|---|---|---|
| 1 | S-1 (81%H$^1$, 19%E$^2$) | 0 | 400 | 5 | 82 | >10,000 | nd$^9$ | 0 | 0 |
| 2 | S-1 (81%H, 19%E) | a$^6$(25) | 400 | 22 | 76 | 9,700(C)$^8$ | nd | 0 | 1 |
| C1 | S-1 (81%H, 19%E) | 0 | 0 | 9 | 0 | 155(c) | nd | 25 | 50 |
| 3 | S-2 (87%H, 13%P$^3$) | 0 | 800 | 4 | 92 | >10,000 | >10,000 | 1 | 2 |
| 4 | S-2 (87%H, 13%P) | b$^7$(25) | 800 | 19 | 97 | >10,000 | >10,000 | 1 | 1 |
| C2 | S-2 (87%H, 13%P) | 0 | 0 | 9 | 0 | 208(c) | <1 | 30 | 75 |
| 5 | 2-3 (85%H, 15%P) | 0 | 800 | 4 | 97 | >10,000 | >10,000 | — | — |
| 6 | S-3 (85%H, 15%P) | b(25) | 800 | 12 | 66 | >10,000 | >10,000 | — | — |
| C3 | S-3 (85%H,$^1$ 15%P) | 0 | 0 | 11 | 0 | 280(c) | <1 | — | — |
| 7 | S-4 (89%0$^4$, 11%E) | 0 | 400 | 15 | 72 | 3,275(po)$^{10}$ | nd | 0 | 0 |
| 8 | S-4 (89%0, 11%E) | a(25) | 400 | 38 | 68 | 6,400(po) | nd | 2 | 3 |
| C4 | S-4 (89%0, 11%E) | 0 | 0 | 18 | 0 | 312(c) | nd | 25 | 60 |
| 9 | S-5 (95%0, 5%P) | 0 | 400 | 19 | 84 | >10,000 | nd | 0 | 0 |

TABLE I-continued

Adhesive Compositions with Saturated Polyolefin

| Ex. No. | Saturated Components | Tackifier (phr) | UV Exposure mJ/cm$^2$ | Peel N/dm | Gel % | Shear Strength 25° (min) (failure mode) | 70° (min) | % Residue 121° C. | 150° C. |
|---|---|---|---|---|---|---|---|---|---|
| 10 | S-5 (95%0, 5%P) | a(25) | 400 | 45 | 79 | 8,400 | nd | 0 | 1 |
| C5 | S-5 (95%0, 5%P) | 0 | 0 | 23 | 0 | 275(c) | nd | 35 | 50 |
| 11 | S-6 (91%D$^5$, 9%E) | 0 | 400 | 16 | 92 | 385(po) | nd | — | — |
| C6 | S-6 (91%D, 9%E) | 0 | 0 | 21 | 0 | 335(c) | nd | — | — |

$^1$H - 1-hexane
$^2$E - ethylene
$^3$P - propylene
$^4$0 - 1-octene
$^5$D - 1-decene
$^6$a - tackifier resin is Regalrez ™ 1126 (from Hercules Chem. Co.)
$^7$b - tackifer resin is Arkon ™ P-115 (from Hercules Chem. Co.)
$^8$c - cohesive failure
$^9$nd - not determined
$^{10}$po - pop off The data in Table I indicate that saturated polyolefins prepared from 1-hexene, and 1-octene having from 5 to 19% ethylene or propylene and containing either zero or 33 parts of tackifier per 100 parts of polyolefin provide tapes having excellent shear at 25° C. when exposed to UV radiation. In addition, the saturated polyolefins leave no or less than 5% residue in the Percent Residue test. Tapes prepared from the polyolefins of the comparative examples leave at least 25% or more adhesive residue in the test.

EXAMPLES 12–32

A series of copoly(1-hexene/propylene) polymers with varying IVs were prepared and crosslinked. (The photo-crosslinker in each case was a sym-triazine.) These samples were prepared and tested identically to those listed in Table I, with the exceptions that the method used to measure IV was modified slightly. The IV was measured with a Fenske No. 75 viscometer and a sample concentration of 0.1 g/dL rather than 0.5 g/dL.

For each IV range, at least two levels of propylene were used. Of the copolymers prepared for each IV, a portion of each was irradiated at 200 mJ/cm$^2$, another at 400 mJ/cm$^2$, and yet another at 600 mJ/cm$^2$. Percent gels for each sample were measured, and the data are compiled below in Table II.

TABLE II

| Example no. | IV (dL/g) | Mole % propylene | UV dose (mJ/cm$^2$) | Average % gel |
|---|---|---|---|---|
| 12 | 1.18 | 16.3 | 200 | 13 |
| 13 | 1.18 | 16.3 | 400 | 19 |
| 14 | 1.18 | 16.3 | 600 | 18 |
| 15 | 1.27 | 7.8 | 200 | 23 |
| 16 | 1.27 | 7.8 | 400 | 29 |
| 17 | 1.27 | 7.8 | 600 | 32 |
| 18 | 1.42 | 5.2 | 200 | 38 |
| 19 | 1.42 | 5.2 | 400 | 43 |
| 20 | 1.42 | 5.2 | 600 | 44 |
| 21 | 1.62 | 10.2 | 200 | 38 |
| 22 | 1.62 | 10.2 | 400 | 46 |
| 23 | 1.62 | 10.2 | 600 | 45 |
| 24 | 1.67 | 14.7 | 200 | 44 |
| 25 | 1.67 | 14.7 | 400 | 52 |
| 26 | 1.67 | 14.7 | 600 | 53 |
| 27 | 2.08 | 24.8 | 200 | 55 |
| 28 | 2.08 | 24.8 | 400 | 61 |
| 29 | 2.08 | 24.8 | 600 | 63 |
| 30 | 2.17 | 2.3 | 200 | 55 |
| 31 | 2.17 | 2.3 | 400 | 60 |
| 32 | 2.17 | 2.3 | 600 | 60 |

At least two observations can be made from the data of Table II. First, for a given IV, more irradiation generally results in higher percent gels. Second, the addition of a lower olefin such as propylene does not affect the performance of the polymer (such as can be measured by the percent gel) uniformly throughout the range of IVs. Specifically, p1 a) at lower IVs (i.e., example nos. 12–17), increasing the number of mer derived from propylene (c.f., the inclusion of more than 16 mole percent in example nos. 12–14 versus the inclusion of only about 7 mole percent in example nos. 15–17) actually can decrease the performance of the resulting PSA—a result believed to be due to the aforementioned tendency of the lower olefin (e.g., propylene) units to be involved in chain scission;

b) at higher IVs (i.e., example nos. 27–32), increasing the number of mer units derived from propylene (c.f, the inclusion of almost 25 mole percent in example nos. 27–29 versus the inclusion of only about 2 mole percent in example nos. 30–32) does not greatly impact the performance of the resulting PSA—a result believed to be due to the previously discussed entanglement issue; and c) at IVs between the extremes (i.e., example nos. 18–26), inclusion of more mer units derived from propylene improves gel—in this same IV range, homopolymers of $C_6$–$C_{12}$ α-olefins have percent gels that are markedly lower.

Thus, in the IV range of about 1.3 to about 2.0, inclusion of mer units derived from one or more $C_2$–$C_5$ α-olefin monomers significantly and unexpectedly improves the PSA performance.

In summary, novel adhesive compositions have been described. Although specific embodiments and examples have been disclosed herein, it should be borne in mind that these have been provided by way of explanation and illustration and the present invention is not limited thereby. Certainly, modifications which are within the ordinary skill in the art are considered to lie within the scope of this invention as defined by the following claims including all equivalents.

We claim:

1. A composition comprising:
   a) a saturated α-olefin polymer comprising
      1) the polymerization product of from about 70 to about 99 mole percent of one or more $C_6$ to $C_{12}$ α-olefin monomers, and
      2) from about 1.0 to about 30 mole percent of one or more $C_2$ to $C_5$ α-olefin monomers, with the proviso that the polymer is derived from $C_6$ to $C_{12}$ and $C_2$ to $C_5$ α-olefin monomers that do not contain pendent methylidyne groups;
   b) an effective amount of a photoactive crosslinking agent to crosslink the composition upon irradiation from a source of actinic radiation; and
   c) from 0 to about 150 parts, per 100 parts polymer, of a tackitying resin, said composition being a pressure sensitive adhesive both before and after cross-linking, said composition prior to crosslinking having an inherent viscosity in the range of 1.3 to 2.0 dL/g when a 0.5 g/dL solution of the composition in toluene is measured at 25° C.

2. The composition of claim 1 wherein said photoactive crosslinking agent is selected from the group consisting of aldehydes, ketones, quinones, thioxanthones and s-triazines.

3. The composition of claim 1 wherein the concentration of said photoactive crosslinking agent is in the range of 0.01 to 6.0 percent by weight of the polymer.

4. The composition of claim 1 further comprising a tackifying resin.

5. The composition of claim 4 wherein said tackifying resin comprises one or more hydrocarbon resins.

6. The composition of claim 5 wherein said tackifying resin is present in an amount up to about 150 parts per hundred parts of the adhesive composition.

7. The adhesive composition of claim 1 further comprising at least one additive selected from the group consisting of pigments, dyes, fillers, plasticizers, stabilizers, antioxidants and processing oils.

8. The composition of claim 1 wherein said composition has been crosslinked.

9. The composition of claim 5 wherein said composition has been crosslinked.

10. The composition of claim 2 wherein said composition has been crosslinked.

11. The composition of claim 8 wherein said composition has a $T_g$ less than about 0° C.

12. An article comprising the composition of claim 1 coated on a substrate.

13. The article of claim 12 wherein the composition has been crosslinked.

14. The article of claim 13 wherein the composition has been crosslinked by ultraviolet radiation.

15. The article of claim 13 wherein the composition has been crosslinked by electron beam irradiation.

16. A method of preparing a radiation curable adhesive composition comprising the steps of:
   a) polymerizing an admixture comprising
      i) one or more $C_6$–$C_{12}$ α-olefin monomers and one or more $C_2$–$C_5$ α-olefin monomers; and
      ii ii) an effective amount of a photoactive cross-linking agent; and
   b) subjecting the admixture to radiation to provide a cross-linked polymer wherein said cross-linked polymer comprises about 70–99 mole percent of $C_6$–$C_{12}$ α-olefin repeat units and about 1–30 mole percent of $C_2$–$C_5$ α-olefin repeat units;
with the proviso that the polymer is derived from α-olefin monomers that do not contain pendent methylidyne groups.

17. The method of claim 16 wherein said radiation is actinic radiation.

18. The method of claim 17 wherein said actinic radiation is ultraviolet radiation.

19. The method of claim 16 wherein said radiation is electron beam radiation.

20. The composition of claim 1, wherein the one or more $C_6$–$C_{12}$ monomers are $C_6$–$C_{10}$ monomers.

21. The composition of claim 1, wherein the one or more $C_6$–$C_{12}$ monomers are $C_6$–$C_8$ monomers.

22. An article comprising the composition of claim 21 coated on a substrate.

23. A method according to claim 16, wherein the one or more $C_6$–$C_{12}$ monomers are $C_6$–$C_{10}$ monomers.

24. A method according to claim 16, wherein the one or more $C_6$–$C_{12}$ monomers are $C_6$–$C_8$ monomers.

25. A composition comprising:
   a) a saturated α-olefin polymer derived from:
      1) about 70 to about 99 mole percent of one or more monomers selected from the group consisting of 1-hexene, 1-octene, and 1-decene, and
      2) about 1.0 to about 30 mole percent of one or more monomers selected from the group consisting of ethylene and propylene;
   b) an effective amount of a photoactive crosslinking agent to crosslink the composition upon irradiation from a source of actinic radiation; and
   c) from 0 to about 150 parts, per 100 parts polymer, of a tackifying resin, said composition being a pressure sensitive adhesive both before and after cross-linking, and said composition prior to crosslinking having an inherent viscosity in the range of 1.3 to 2.0 dL/g when a 0.5 g/dL solution of the composition in toluene is measured at 25° C.

26. A composition comprising:
(a) a saturated α-olefin polymer having the general formula:

$$(M^1)_x\text{–}(M^2)_y \qquad\qquad I$$

wherein:
   x and y are numbers designating the relative molar amounts of $M^1$ and $M^2$ that are randomly located in the backbone chain of the polymer such that the polymer has a weight average molecular weight of at least 250,000, x is from about 70 to about 99 mole percent of the sum (x+y) and y is from about 1 to about 30 mole percent of the sum (x+y);
   $M^1$ is an ethanediyl repeat unit having a pendent hydrocarbyl group containing 4 to 10 carbon atoms; and
   $M^2$ is different from $M^1$ and is an ethanediyl repeat unit selected from ethylene or units having a pendent hydrocarbyl group selected from linear alkyl groups having 1–3 carbon atoms;
(b) an effective amount of a photoactive crosslinking agent to crosslink the composition upon irradiation from a source of actinic radiation; and (c) from 0 to about 150 parts per 100 parts polymer of a tackifying resin, said composition being a pressure sensitive adhesive both before and after cross-linking, and said composition prior to crosslinking having an inherent viscosity in the range of 1.3 to 2.0 dL/g when a 0.5 g/dL solution of the composition in toluene is measured at 25° C.

27. The composition of claim 26 wherein the α-olefin polymer has the general formula:

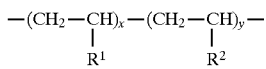

wherein:

R$^1$ is an alkyl group having 4 to 8 carbon atoms;

R$^2$ is hydrogen or an alkyl group having 1–3 carbon atoms; and x and y are numbers designating relative molar amounts of monomer units comprising the backbone of the polymer such that the α-olefin polymer has a weight average molecular weight of 250,000 to 5,000,000, x being 70 to 99% of the sum (x+y) and y being 1 to 30% of the sum (x+y).

28. The composition of claim 27 wherein the α-olefin polymer has the general formula:

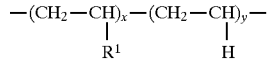

wherein:

R$^1$ is an alkyl group having 4 to 8 carbon atoms; and x and y are numbers designating relative molar amounts of monomer units comprising the backbone of the polymer such that the α-olefin polymer has a weight average molecular weight of 250,000 to 5,000,000, x being 70 to 99% of the sum (x+y) and y being 1 to 30% of the sum (x+y).

* * * * *